US012212002B2

(12) United States Patent
Mesuda et al.

(10) Patent No.: US 12,212,002 B2
(45) Date of Patent: Jan. 28, 2025

(54) BINDER COMPOSITION FOR ELECTROCHEMICAL DEVICE ELECTRODE, SLURRY COMPOSITION FOR ELECTROCHEMICAL DEVICE ELECTRODE, ELECTRODE FOR ELECTROCHEMICAL DEVICE, AND ELECTROCHEMICAL DEVICE

(71) Applicant: ZEON CORPORATION, Tokyo (JP)

(72) Inventors: Maki Mesuda, Tokyo (JP); Yukie Ito, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 1018 days.

(21) Appl. No.: 16/973,037

(22) PCT Filed: Jun. 24, 2019

(86) PCT No.: PCT/JP2019/024968
§ 371 (c)(1),
(2) Date: Dec. 8, 2020

(87) PCT Pub. No.: WO2020/004332
PCT Pub. Date: Jan. 2, 2020

(65) Prior Publication Data
US 2021/0273227 A1  Sep. 2, 2021

(30) Foreign Application Priority Data

Jun. 29, 2018 (JP) ................. 2018-124643

(51) Int. Cl.
| | |
|---|---|
| *H01M 4/62* | (2006.01) |
| *C08L 33/08* | (2006.01) |
| *C08L 33/10* | (2006.01) |
| *C08L 33/20* | (2006.01) |
| *H01M 10/0525* | (2010.01) |

(52) U.S. Cl.
CPC ............. *H01M 4/622* (2013.01); *C08L 33/08* (2013.01); *C08L 33/10* (2013.01); *C08L 33/20* (2013.01); *H01M 10/0525* (2013.01); *C08L 2203/20* (2013.01); *C08L 2207/53* (2013.01)

(58) Field of Classification Search
CPC .... H01M 4/622; H01M 10/0525; H01M 4/13; H01M 4/139; C08L 33/08; C08L 33/10; C08L 33/20; C08L 2203/20; C08L 2207/53; C08L 51/003; Y02T 10/70; C08F 220/44; C08F 265/06; C08F 265/00; Y02E 60/10; H01G 11/38

USPC ......................................... 429/217
See application file for complete search history.

(56) References Cited

U.S. PATENT DOCUMENTS

| | | | |
|---|---|---|---|
| 8,119,289 B2 | 2/2012 | Fukumine et al. | |
| 10,910,651 B2 | 2/2021 | Murase et al. | |
| 11,152,667 B2 | 10/2021 | Sasaki et al. | |
| 2009/0316334 A1* | 12/2009 | Fukumine | H01M 4/0404 |
| | | | 429/217 |
| 2013/0330622 A1 | 12/2013 | Sasaki | |
| 2017/0256800 A1 | 9/2017 | Kaneda et al. | |
| 2019/0097235 A1* | 3/2019 | Murase | C08F 220/12 |

FOREIGN PATENT DOCUMENTS

| | | | |
|---|---|---|---|
| JP | 2012204303 A | | 10/2012 |
| JP | 2016072247 A | * | 5/2016 |
| KR | 1020080005375 A | | 1/2008 |
| WO | 2012115096 A1 | | 8/2012 |
| WO | 2015064411 A1 | | 5/2015 |
| WO | 2016035286 A1 | | 3/2016 |
| WO | 2017155059 A1 | | 9/2017 |

OTHER PUBLICATIONS

Apr. 26, 2022, the Extended European Search Report issued by the European Patent Office in the corresponding European Patent Application No. 19827360.9.
Dec. 29, 2020, International Preliminary Report on Patentability issued in the International Patent Application No. PCT/JP2019/024968.

* cited by examiner

*Primary Examiner* — Maria Laios
(74) *Attorney, Agent, or Firm* — KENJA IP LAW PC

(57) ABSTRACT

Provided is a binder composition for an electrochemical device electrode with which it is possible to form an electrode mixed material layer that has excellent peel strength and dusting resistance and that can cause an electrochemical device to display excellent rate characteristics. The binder composition for an electrochemical device electrode contains a binder and an organic solvent. The binder includes a particulate polymer A and a polymer B. The particulate polymer A has a core-shell structure including a core portion and a shell portion at least partially covering an outer surface of the core portion, and a polymer forming the shell portion has a glass-transition temperature of −50° C. to 20° C. A mixture obtained by mixing the polymer B in a concentration of 8 mass % with the organic solvent has a viscosity at a shear rate of 1 s$^{-1}$ of 100 mPa·s to 10,000 mPa·s.

8 Claims, No Drawings

BINDER COMPOSITION FOR ELECTROCHEMICAL DEVICE ELECTRODE, SLURRY COMPOSITION FOR ELECTROCHEMICAL DEVICE ELECTRODE, ELECTRODE FOR ELECTROCHEMICAL DEVICE, AND ELECTROCHEMICAL DEVICE

TECHNICAL FIELD

The present disclosure relates to a binder composition for an electrochemical device electrode, a slurry composition for an electrochemical device electrode, an electrode for an electrochemical device, and an electrochemical device.

BACKGROUND

Electrochemical devices such as lithium ion secondary batteries and electric double-layer capacitors have characteristics such as compact size, light weight, high energy-density, and the ability to be repeatedly charged and discharged, and are used in a wide variety of applications.

An electrode for a lithium ion secondary battery, for example, generally includes a current collector and an electrode mixed material layer (positive electrode mixed material layer or negative electrode mixed material layer) formed on the current collector. This electrode mixed material layer is formed by, for example, applying a slurry composition containing an electrode active material, a binder-containing binder composition, and so forth onto the current collector, and then drying the applied slurry composition.

In recent years, attempts have been made to improve binder compositions used in the formation of electrode mixed material layers with the aim of achieving even better electrochemical device performance.

For example, Patent Literature (PTL) 1 proposes producing a secondary battery that can display excellent rate characteristics and cycle characteristics by using a binder composition for a secondary battery electrode that contains a first particulate polymer having a core-shell structure including a core portion and a shell portion partially covering an outer surface of the core portion. PTL 1 discloses that it is preferable for a polymer forming the core portion to have a glass-transition temperature of not lower than −60° C. and not higher than −15° C. and for a polymer forming the shell portion to have a glass-transition temperature of not lower than 40° C. and not higher than 200° C.

CITATION LIST

Patent Literature

PTL 1: WO2016/035286A1

SUMMARY

Technical Problem

It is desirable for an electrode mixed material layer to have excellent peel strength (strength of close adherence between components in the electrode mixed material layer and strength of close adherence between the electrode mixed material layer and a current collector) from a viewpoint of enhancing electrochemical device performance.

Moreover, there are instances in which an electrode is cut to a desired size before being immersed in electrolyte solution in a production process of an electrochemical device. When the binding capacity of a binder contained in the electrode mixed material layer is insufficient in such a situation, an electrode active material and the like contained in the electrode mixed material layer may become detached from the electrode mixed material layer (hereinafter, also referred to as "dusting"), and this may subsequently lead to reduction of performance of an electrochemical device in an operational environment of the electrochemical device. For this reason, it is necessary for an electrode mixed material layer to have low tendency for dusting (i.e., have excellent dusting resistance).

Furthermore, in a case in which an electrochemical device is to be used in an application in which rapid charging and discharging are required, such as an electric tool or an electric vehicle, for example, it is necessary for the electrochemical device to display excellent rate characteristics.

In recent years, there has been demand for densification and increased basis weight of electrode mixed material layers in order to increase the capacity of electrochemical devices.

However, when an electrode mixed material layer having increased density and basis weight has been formed using a slurry composition that contains the binder composition of the conventional technique described above in an attempt to increase the capacity of an electrochemical device, there have been cases in which peel strength and dusting resistance of the electrode mixed material layer and rate characteristics of the electrochemical device have been inadequate. Therefore, there is room for improvement of a slurry composition containing the binder composition of the conventional technique described above in terms of causing an obtained electrode mixed material layer to display excellent peel strength and dusting resistance and enhancing rate characteristics of an electrochemical device even in a case in which density and basis weight are increased.

Accordingly, one object of the present disclosure is to provide a binder composition for an electrochemical device electrode and a slurry composition for an electrochemical device electrode with which it is possible to form an electrode mixed material layer that has excellent peel strength and dusting resistance and that can cause an electrochemical device to display excellent rate characteristics.

Another object of the present disclosure is to provide an electrode for an electrochemical device including an electrode mixed material layer that has excellent peel strength and dusting resistance and that can cause an electrochemical device to display excellent rate characteristics.

Yet another object of the present disclosure is to provide an electrochemical device that includes the aforementioned electrode and that has excellent rate characteristics.

Solution to Problem

The inventors conducted diligent investigation with the aim of solving the problems set forth above. The inventors discovered that by using a binder composition for an electrochemical device electrode that contains an organic solvent and a binder including a particulate polymer having a core-shell structure including a specific shell portion and a polymer having a specific property, it is possible to form an electrode mixed material layer that has excellent peel strength and dusting resistance and that can cause an electrochemical device to display excellent rate characteristics, and, in this manner, completed the present disclosure.

Specifically, the present disclosure aims to advantageously solve the problems set forth above, and a presently disclosed binder composition for an electrochemical device electrode comprises a binder and an organic solvent, wherein the binder includes a particulate polymer A and a polymer B, the particulate polymer A has a core-shell structure including a core portion and a shell portion at least partially covering an outer surface of the core portion, a polymer forming the shell portion has a glass-transition temperature of not lower than −50° C. and not higher than 20° C., and a mixture obtained by mixing the polymer B in a concentration of 8 mass % with the organic solvent has a viscosity at a shear rate of 1 $s^{-1}$ of not less than 100 mPa·s and not more than 10,000 mPa·s. By using a binder composition for an electrochemical device electrode that contains an organic solvent and a binder including a particulate polymer A that has a core-shell structure including a shell portion having the specific glass-transition temperature set forth above and a polymer B that has the specific property set forth above in this manner, it is possible to form an electrode mixed material layer that has excellent peel strength and dusting resistance and that can cause an electrochemical device to display excellent rate characteristics.

Note that the "glass-transition temperature" and "viscosity at a shear rate of 1 $s^{-1}$" can be measured by methods described in the EXAMPLES section of the present specification.

In the presently disclosed binder composition for an electrochemical device electrode, proportional content of the polymer B in the binder is preferably not less than 60 mass % and not more than 95 mass %. When the proportional content of the polymer B in the binder is within the specific range set forth above, peel strength and dusting resistance of an obtained electrode mixed material layer can be further increased, and rate characteristics of an electrochemical device can be further enhanced.

In the presently disclosed binder composition for an electrochemical device electrode, the polymer B preferably includes a cyano group-containing monomer unit in a proportion of 60 mass % or more. When the polymer B includes a cyano group-containing monomer unit in at least the specific proportion set forth above, peel strength and dusting resistance of an obtained electrode mixed material layer can be further increased, and rate characteristics of an electrochemical device can be further enhanced.

In the presently disclosed binder composition for an electrochemical device electrode, a polymer forming the core portion preferably includes a cross-linkable monomer unit in a proportion of not less than 0.01 mass % and not more than 4.00 mass %. When the polymer forming the core portion includes a cross-linkable monomer unit in the specific proportion set forth above, peel strength and dusting resistance of an obtained electrode mixed material layer can be further increased, and rate characteristics of an electrochemical device can be further enhanced.

In the presently disclosed binder composition for an electrochemical device electrode, it is preferable that a mixture obtained by mixing the binder in a concentration of 8 mass % with the organic solvent has a viscosity at a shear rate of 1 $s^{-1}$ of 5,000 mPa·s or more. When the viscosity at a shear rate of 1 $s^{-1}$ of a mixture obtained by mixing the binder in a concentration of 8 mass % with the organic solvent is at least the specific value set forth above, peel strength and dusting resistance of an obtained electrode mixed material layer can be further increased, and rate characteristics of an electrochemical device can be further enhanced.

Moreover, the present disclosure aims to advantageously solve the problems set forth above, and a presently disclosed slurry composition for an electrochemical device electrode comprises: an electrode active material; and any one of the binder compositions for an electrochemical device electrode set forth above. By using a slurry composition for an electrochemical device electrode that contains an electrode active material and any one of the binder compositions for an electrochemical device electrode set forth above in this manner, it is possible to form an electrode mixed material layer that has excellent peel strength and dusting resistance and that can cause an electrochemical device to display excellent rate characteristics.

Furthermore, the present disclosure aims to advantageously solve the problems set forth above, and a presently disclosed electrode for an electrochemical device comprises an electrode mixed material layer formed using the slurry composition for an electrochemical device electrode set forth above. An electrode for an electrochemical device such as set forth above includes an electrode mixed material layer that has excellent peel strength and dusting resistance and that can cause an electrochemical device to display excellent rate characteristics.

Also, the present disclosure aims to advantageously solve the problems set forth above, and a presently disclosed electrochemical device comprises the electrode for an electrochemical device set forth above. The presently disclosed electrochemical device includes an electrode mixed material layer having excellent peel strength and dusting resistance and can display excellent rate characteristics.

Advantageous Effect

According to the present disclosure, it is possible to provide a binder composition for an electrochemical device electrode and a slurry composition for an electrochemical device electrode with which it is possible to form an electrode mixed material layer that has excellent peel strength and dusting resistance and that can cause an electrochemical device to display excellent rate characteristics.

Moreover, according to the present disclosure, it is possible to provide an electrode for an electrochemical device including an electrode mixed material layer that has excellent peel strength and dusting resistance and that can cause an electrochemical device to display excellent rate characteristics.

Furthermore, according to the present disclosure, it is possible to provide an electrochemical device that includes the aforementioned electrode and that can display excellent rate characteristics.

DETAILED DESCRIPTION

The following provides a detailed description of embodiments of the present disclosure.

The presently disclosed binder composition for an electrochemical device electrode (hereinafter, also referred to simply as a "binder composition") can be used in production of a slurry composition for an electrochemical device electrode (hereinafter, also referred to simply as a "slurry composition"). A slurry composition for an electrochemical device electrode that is produced using the presently disclosed binder composition for an electrochemical device electrode can be used in production of an electrode of an electrochemical device such as a lithium ion secondary battery. A feature of the presently disclosed electrode for an electrochemical device (hereinafter, also referred to simply as an "electrode") is that it includes an electrode mixed material layer formed using the presently disclosed slurry composition for an electrochemical device electrode. Moreover, a feature of the presently disclosed electrochemical device is that it includes the presently disclosed electrode for an electrochemical device.

(Binder Composition for Electrochemical Device Electrode)

The presently disclosed binder composition for an electrochemical device electrode is a binder composition for an electrochemical device electrode that contains a binder and an organic solvent. A feature of the binder is that it includes a particulate polymer A having a core-shell structure including a shell portion having a glass-transition temperature within a specific range and a polymer B having a specific property. The presently disclosed binder composition for an electrochemical device electrode may contain any other components in addition to the binder and the organic solvent.

As a result of the presently disclosed binder composition for an electrochemical device electrode containing an organic solvent and a binder that includes a particulate polymer A having a core-shell structure including a shell portion having a glass-transition temperature in the specific range mentioned above and a polymer B having the specific property mentioned above, reduction of peel strength and dusting resistance can be inhibited even in a case in which a high-density and high-basis weight electrode mixed material layer is formed, for example, through use of a slurry composition that contains the presently disclosed binder composition. Accordingly, it is possible to form an electrode mixed material layer that has excellent peel strength and dusting resistance and that can cause an electrochemical device to display excellent rate characteristics. Although the reason for this is not clear, it is presumed to be as follows.

Specifically, it is presumed that as a result of the binder composition containing the particulate polymer A that has a core-shell structure including a shell portion having the specific glass-transition temperature, the adhesion area of the particulate polymer A increases after electrode pressing in a situation in which an electrode mixed material layer is formed using a slurry composition that contains the binder composition, which can impart excellent peel strength and dusting resistance to the obtained electrode mixed material layer. Moreover, it is presumed that as a result of the binder composition containing the polymer B having the specific property, a slurry composition that contains the binder composition can be provided with suitable viscosity to thereby increase coatability of the slurry composition and impart excellent peel strength and dusting resistance to an obtained electrode mixed material layer. Furthermore, it is presumed that as a result of the binder composition containing the polymer B, an electrode active material and the like can be compounded with a sufficient solid content concentration in a slurry composition without causing sedimentation thereof, and thus an electrochemical device that includes an obtained electrode mixed material layer can be caused to display excellent rate characteristics.

<Binder>

The binder is a component that, in an electrode produced by forming an electrode mixed material layer on a current collector using a slurry composition that contains the binder composition, holds components contained in the electrode mixed material layer so that the components do not become detached from the electrode mixed material layer. The presently disclosed binder composition contains a particulate polymer A that has a core-shell structure including a shell portion having a glass-transition temperature within a specific range and a polymer B that has a specific property as the binder.

<<Particulate Polymer A>>

The particulate polymer A is a component that can impart excellent peel strength and dusting resistance to an electrode mixed material layer formed using the binder composition.

[Structure of Particulate Polymer A]

The particulate polymer A has a core-shell structure including a core portion and a shell portion at least partially covering an outer surface of the core portion. In other words, the shell portion of the particulate polymer A may partially cover the outer surface of the core portion or may completely cover the outer surface of the core portion.

Note that the particulate polymer A may include any constituent element other than the core portion and the shell portion described above so long as the expected effects are not significantly lost as a result. Specifically, the particulate polymer A may, for example, include a portion inside of the core portion that is formed of a different polymer to the core portion. In one specific example, a residual seed particle may be present inside of the core portion in a situation in which seed particles are used in production of the particulate polymer A by seeded polymerization. However, from a viewpoint of more noticeably displaying the expected effects, it is preferable that the particulate polymer A includes only the core portion and the shell portion.

—Core Portion—

=Chemical Composition=

A polymer forming the core portion can include an acid group-containing monomer unit, a (meth)acrylic acid ester monomer unit, a cross-linkable monomer unit, and the like, for example, without any specific limitations.

Note that the phrase "include a monomer unit" as used in the present specification means that "a repeating unit derived from the monomer is included in a polymer obtained using the monomer".

==Acid Group-Containing Monomer Unit==

An acid group-containing monomer unit is a repeating unit that is derived from an acid group-containing monomer. When the polymer forming the core portion includes an acid group-containing monomer unit, the polymer can display excellent binding capacity, and, as a result, an obtained electrode mixed material layer can display even better peel strength.

Examples of acid group-containing monomers that can form an acid group-containing monomer unit include carboxy group-containing monomers, sulfo group-containing monomers, and phosphate group-containing monomers.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a carboxy group-containing monomer.

Examples of sulfo group-containing monomers include styrene sulfonic acid, vinyl sulfonic acid, methyl vinyl sulfonic acid, (meth)allyl sulfonic acid, 3-allyloxy-2-hydroxypropane sulfonic acid, and 2-acrylamido-2-methylpropane sulfonic acid.

In the present specification, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One of these acid group-containing monomers may be used individually, or two or more of these acid group-containing monomers may be used in combination. Of these acid group-containing monomers, carboxy group-containing monomers are preferable from a viewpoint of even further increasing peel strength of an obtained electrode mixed material layer, of which, acrylic acid, methacrylic acid, itaconic acid, maleic acid, and fumaric acid are preferable, and methacrylic acid is more preferable.

The proportional content of an acid group-containing monomer unit in the polymer forming the core portion when all repeating units in the polymer forming the core portion are taken to be 100.00 mass % is preferably 1.00 mass % or more, more preferably 1.50 mass % or more, even more preferably 2.00 mass % or more, particularly preferably 3.00 mass % or more, and most preferably 4.00 mass % or more, and is preferably 10.00 mass % or less, more preferably 8.00 mass % or less, even more preferably 6.00 mass % or less, and particularly preferably 5.00 mass % or less. When the proportional content of an acid group-containing monomer unit is within any of the ranges set forth above, peel strength of an electrode mixed material layer formed using a slurry composition that contains the binder composition can be even further increased.

==Cross-Linkable Monomer Unit==

A cross-linkable monomer unit is a repeating unit that is derived from a cross-linkable monomer. A cross-linkable monomer is a monomer that can form a cross-linked structure when it is polymerized. When the polymer forming the core portion includes a cross-linkable monomer unit, peel strength and dusting resistance of an obtained electrode mixed material layer can be further increased, and the degree of swelling in electrolyte solution of the particulate polymer A can be reduced. Accordingly, reduction of a void part of an electrode mixed material layer due to excessive swelling of the particulate polymer A in electrolyte solution can be inhibited, and internal resistance of an electrochemical device can be reduced to thereby further enhance rate characteristics of the electrochemical device. Examples of cross-linkable monomers include monomers that include two or more reactive groups per one molecule.

More specifically, a polyfunctional ethylenically unsaturated carboxylic acid ester monomer that includes two or more ethylenically unsaturated bonds can be used as a cross-linkable monomer.

Examples of difunctional ethylenically unsaturated carboxylic acid ester monomers including two ethylenically unsaturated bonds in a molecule include allyl acrylate, allyl methacrylate, ethylene diacrylate, ethylene dimethacrylate, 2-hydroxy-3-acryloyloxypropyl methacrylate, polyethylene glycol diacrylate, propoxylated ethoxylated bisphenol A diacrylate, ethoxylated bisphenol A diacrylate, 9,9-bis[4-(2-acryloyloxyethoxy)phenyl]fluorene, propoxylated bisphenol A diacrylate, tricyclodecane dimethanol diacrylate, 1,10-decanediol diacrylate, 1,6-hexanediol diacrylate, 1,9-nonanediol diacrylate, polypropylene glycol diacrylate, polypropylene glycol dimethacrylate, polytetramethylene glycol diacrylate, ethylene glycol dimethacrylate, diethylene glycol dimethacrylate, polyethylene glycol dimethacrylate, ethoxylated bisphenol A dimethacrylate, tricyclodecane dimethanol dimethacrylate, 1,10-decanediol dimethacrylate, 1,6-hexanediol dimethacrylate, 1,9-nonanediol dimethacrylate, neopentyl glycol dimethacrylate, ethoxylated polypropylene glycol dimethacrylate, and glycerin dimethacrylate.

Examples of trifunctional ethylenically unsaturated carboxylic acid ester monomers including three ethylenically unsaturated bonds in a molecule include ethoxylated isocyanuric acid triacrylate, ε-caprolactone-modified tris(2-acryloxyethyl) isocyanurate, ethoxylated glycerin triacrylate, pentaerythritol triacrylate, trimethylolpropane triacrylate, and trimethylolpropane trimethacrylate.

Examples of ethylenically unsaturated carboxylic acid ester monomers having a functionality of four or higher that include four or more ethylenically unsaturated bonds in a molecule include di(trimethylolpropane) tetraacrylate, ethoxylated pentaerythritol tetraacrylate, pentaerythritol tetraacrylate, dipentaerythritol polyacrylate, and dipentaerythritol hexaacrylate.

Of these examples, allyl methacrylate (difunctional), ethylene glycol dimethacrylate (difunctional), trimethylolpropane triacrylate (trifunctional), and ethoxylated pentaerythritol tetraacrylate (tetrafunctional) are preferable from a viewpoint of even further increasing peel strength and dusting resistance of an obtained electrode mixed material layer and even further enhancing rate characteristics of an electrochemical device, with the use of allyl methacrylate being particularly preferable.

The proportional content of a cross-linkable monomer unit in the polymer forming the core portion when all repeating units included in the polymer forming the core portion are taken to be 100.00 mass % is preferably 0.01 mass % or more, and more preferably 0.02 mass % or more, and is preferably 4.00 mass % or less, more preferably 1.00 mass % or less, and even more preferably 0.40 mass % or less. When the proportional content of a cross-linkable monomer unit in the polymer forming the core portion is not less than any of the lower limits set forth above, peel strength and dusting resistance of an obtained electrode mixed material layer can be even further increased, the degree of swelling in electrolyte solution of the binder can be further reduced, and, as a result, internal resistance of an electrochemical device including the obtained electrode mixed material layer can be further reduced and rate characteristics of the electrochemical device can be even further enhanced. Moreover, when the proportional content of a cross-linkable monomer unit in the polymer forming the core portion is not more than any of the upper limits set forth above, a polymerization reaction can be performed well in production of the polymer forming the core portion.

==(Meth)Acrylic Acid Ester Monomer Unit==

A (meth)acrylic acid ester monomer unit is a repeating unit that is derived from a (meth)acrylic acid ester monomer. In the present specification, "(meth)acryl" is used to indicate "acryl" or "methacryl". When the polymer forming the core portion includes a (meth)acrylic acid ester monomer unit, an obtained electrode mixed material layer can be provided with a suitable degree of affinity with electrolyte solution, and rate characteristics of an electrochemical device including the electrode mixed material layer can be further enhanced.

The (meth)acrylic acid ester monomer may be a (meth)acrylic acid alkyl ester monomer in which the number of ethylenically unsaturated bonds is 1. Moreover, the (meth)acrylic acid alkyl ester monomer may be a (meth)acrylic acid alkyl ester monomer that includes a linear alkyl group or a (meth)acrylic acid alkyl ester monomer that includes a branched alkyl group. Examples of (meth)acrylic acid ester monomers include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, butyl acrylate and methyl methacrylate are preferable from a viewpoint of even further enhancing rate characteristics of an electrochemical device. Note that just one of these (meth)acrylic acid ester monomers may be used or two or more of these (meth)acrylic acid ester monomers may be used in combination.

The proportional content of a (meth)acrylic acid ester monomer unit in the polymer forming the core portion when all repeating units included in the polymer forming the core portion are taken to be 100.00 mass % is preferably 30.00 mass % or more, and more preferably 40.50 mass % or more, and is preferably 98.00 mass % or less, and more preferably 95.60 mass % or less. When the proportional content of a (meth)acrylic acid ester monomer unit in the polymer forming the core portion is within any of the ranges set forth above, an obtained electrode mixed material layer can be provided with a suitable degree of affinity with electrolyte solution, and rate characteristics of an electrochemical device including the electrode mixed material layer can be even further enhanced.

==Other Monomer Units==

The polymer forming the core portion may include other monomer units derived from other monomers that are copolymerizable with the various types of monomers set forth above. Examples of other monomers that can form such other monomer units include known monomers that can be used in production of a binding component in a binder composition for an electrochemical device electrode. More specific examples of such other monomers include aromatic vinyl monomers such as styrene, α-methylstyrene, butoxystyrene, and vinylnaphthalene; cyano group-containing monomers such as acrylonitrile, methacrylonitrile, 2-cyanoethyl acrylate, and 2-cyanoethyl methacrylate; and amide group-containing monomers such as acrylamide, dimethylacrylamide, and hydroxyethylacrylamide. One of these other monomers may be used individually, or two or more of these other monomers may be used in combination.

The proportional content of other monomer units in the polymer forming the core portion when all repeating units in the polymer forming the core portion are taken to be 100.00 mass % is preferably 50 mass % or less, and may be 0.00 mass %.

=Glass-Transition Temperature=

The glass-transition temperature of the polymer forming the core portion is preferably −40° C. or higher, and more preferably −15° C. or higher, and is preferably 80° C. or lower, more preferably 35° C. or lower, and even more preferably 26° C. or lower. When the glass-transition temperature of the polymer forming the core portion is not lower than any of the lower limits set forth above, the degree of swelling in electrolyte solution of the particulate polymer A can be reduced. Accordingly, reduction of a void part of an electrode mixed material layer due to excessive swelling of the particulate polymer A in electrolyte solution can be inhibited, and internal resistance of an electrochemical device can be reduced to thereby enhance rate characteristics of the electrochemical device. Moreover, when the glass-transition temperature of the polymer forming the core portion is not higher than any of the upper limits set forth above, an obtained electrode mixed material layer can be provided with good pressability, and thus the electrode mixed material layer can be effectively densified by pressing. Note that the glass-transition temperature of the polymer forming the core portion is normally higher than the glass-transition temperature of a subsequently described polymer forming the shell portion. The glass-transition temperature of the polymer forming the core portion can be controlled, for example, by altering the type and/or amount of a (meth)acrylic acid ester monomer or by altering the type or proportion of another monomer in a monomer composition used to produce the polymer forming the core portion.

—Shell Portion—

=Glass-Transition Temperature=

The polymer forming the shell portion is normally a different polymer to the polymer forming the core portion set forth above. The glass-transition temperature of the polymer forming the shell portion is required to be −50° C. or higher, and is preferably −40° C. or higher, and more preferably −35° C. or higher. Moreover, the glass-transition temperature of the polymer forming the shell portion is required to be 20° C. or lower, and is preferably 10° C. or lower, more preferably 4° C. or lower, and even more preferably −10° C. or lower. When the glass-transition temperature of the polymer forming the shell portion is not lower than any of the lower limits set forth above, the degree of swelling in electrolyte solution of the particulate polymer A can be reduced. Accordingly, reduction of a void part of an electrode mixed material layer due to excessive swelling of the particulate polymer A in electrolyte solution can be inhibited, and internal resistance of an electrochemical device can be reduced to thereby enhance rate characteristics of the electrochemical device. Moreover, when the glass-transition temperature of the polymer forming the shell portion is not higher than any of the upper limits set forth above, peel strength and dusting resistance of an obtained electrode mixed material layer can be increased.

The glass-transition temperature of the polymer forming the shell portion can be controlled by, for example, altering the type and/or amount of a (meth)acrylic acid ester monomer or altering the type and/or proportion of another monomer in a monomer composition used to produce the subsequently described polymer forming the shell portion.

=Chemical Composition=

The polymer forming the shell portion can include a (meth)acrylic acid ester monomer unit, an acid group-containing monomer unit, a hydroxy group-containing monomer unit, a cross-linkable monomer unit, and the like, for example, without any specific limitations.

==(Meth)Acrylic Acid Ester Monomer Unit==

A (meth)acrylic acid ester monomer unit is a repeating unit that is derived from a (meth)acrylic acid ester monomer. When the polymer forming the shell portion includes a (meth)acrylic acid ester monomer unit, peel strength and dusting resistance of an obtained electrode mixed material layer can be further increased.

Examples of (meth)acrylic acid ester monomers that can be used include the (meth)acrylic acid ester monomers that were previously described in the "Particulate polymer A" section. The use of butyl acrylate and methyl methacrylate as (meth)acrylic acid ester monomers is preferable from a viewpoint of even further increasing peel strength and dusting resistance of an electrode mixed material layer.

The proportional content of a (meth)acrylic acid ester monomer unit in the polymer forming the shell portion when all repeating units included in the polymer forming the shell portion are taken to be 100.00 mass % is preferably 40.00 mass % or more, more preferably 78.00 mass % or more, and even more preferably 92.00 mass % or more, and is preferably 99.00 mass % or less, more preferably 98.00 mass % or less, and even more preferably 95.00 mass % or less. When the proportional content of a (meth)acrylic acid ester monomer unit in the polymer forming the shell portion is within any of the ranges set forth above, peel strength and dusting resistance of an obtained electrode mixed material layer can be even further increased.

==Acid Group-Containing Monomer Unit==

An acid group-containing monomer unit is a repeating unit that is derived from an acid group-containing monomer. When the polymer forming the shell portion includes an acid group-containing monomer unit, peel strength and dusting resistance of an obtained electrode mixed material layer can be further increased.

Examples of acid group-containing monomers that can be used include the acid group-containing monomers that were previously described in the "Particulate polymer A" section. Acrylic acid is preferably used as an acid group-containing monomer from a viewpoint of even further increasing peel strength and dusting resistance of an electrode mixed material layer.

The proportional content of an acid group-containing monomer unit in the polymer forming the shell portion when all repeating units included in the polymer forming the shell portion are taken to be 100.00 mass % is preferably 0.50 mass % or more, more preferably 1.00 mass % or more, even more preferably 1.50 mass % or more, and particularly preferably 2.60 mass % or more, and is preferably 10.00 mass % or less, more preferably 7.00 mass % or less, and even more preferably 5.00 mass % or less. When the proportional content of an acid group-containing monomer unit in the polymer forming the shell portion is within any of the ranges set forth above, peel strength and dusting resistance of an obtained electrode mixed material layer can be even further increased.

==Hydroxy Group-Containing Monomer Unit==

A hydroxy group-containing monomer unit is a repeating unit that is derived from a hydroxy group-containing monomer. When the polymer forming the shell portion includes a hydroxy group-containing monomer unit, peel strength and dusting resistance of an obtained electrode mixed material layer can be further increased.

Examples of hydroxy group-containing monomers include 2-hydroxyethyl acrylate, 2-hydroxypropyl acrylate, 2-hydroxyethyl methacrylate, and 2-hydroxypropyl methacrylate. The use of 2-hydroxyethyl acrylate is preferable from a viewpoint of even further increasing peel strength and dusting resistance of an electrode mixed material layer.

The proportional content of a hydroxy group-containing monomer unit in the polymer forming the shell portion can be freely adjusted within a range with which the desired effects are obtained.

==Cross-Linkable Monomer Unit==

A cross-linkable monomer unit is a repeating unit that is derived from a cross-linkable monomer. When the polymer forming the shell portion includes a cross-linkable monomer unit, the degree of swelling in electrolyte solution of the particulate polymer A can be reduced. Accordingly, reduction of a void part of an electrode mixed material layer due to excessive swelling of the particulate polymer A in electrolyte solution can be inhibited, and internal resistance of an electrochemical device can be reduced to thereby further enhance rate characteristics of the electrochemical device. Examples of cross-linkable monomers that can be used include the cross-linkable monomers that were previously described in the "Core portion" section.

The proportional content of a cross-linkable monomer unit in the polymer forming the shell portion when all repeating units included in the polymer forming the shell portion are taken to be 100.00 mass % is preferably 0.01 mass % or more, more preferably 0.02 mass % or more, and even more preferably 0.40 mass % or more, and is preferably 4.00 mass % or less, and more preferably 1.00 mass % or less. When the proportional content of a cross-linkable monomer unit in the polymer forming the shell portion is not less than any of the lower limits set forth above, the degree of swelling in electrolyte solution of the binder can be further reduced, and, as a result, internal resistance of an electrochemical device including an obtained electrode mixed material layer can be further reduced and rate characteristics of the electrochemical device can be even further enhanced. Moreover, when the proportional content of a cross-linkable monomer unit in the polymer forming the shell portion is not more than any of the upper limits set forth above, a polymerization reaction can be performed well in production of the polymer forming the shell portion.

—Mass Ratio of Core Portion and Shell Portion—

Although no specific limitations are placed on the mass ratio of the core portion and the shell portion in the particulate polymer A, the mass proportion of the shell portion in the particulate polymer A when the overall particulate polymer A is taken to be 100 mass % is preferably 10 mass % or more, more preferably 15 mass % or more, and even more preferably 20 mass % or more, and is preferably 30 mass % or less, and more preferably 25 mass % or less. When the mass proportion of the shell portion in the particulate polymer A is not less than any of the lower limits set forth above, peel strength and dusting resistance of an obtained electrode mixed material layer can be further increased. On the other hand, when the mass proportion of the shell portion is not more than any of the upper limits set forth above, the degree of swelling in electrolyte solution of the particulate polymer A can be reduced, and rate characteristics of an electrochemical device including an obtained electrode mixed material layer can be further enhanced.

[Viscosity of Particulate Polymer A]

The viscosity at a shear rate of $1 \text{ s}^{-1}$ of a mixture obtained by mixing the particulate polymer A in a concentration of 8 mass % with the organic solvent is preferably 1,000 mPa·s or less, more preferably 500 mPa·s or less, and even more preferably 150 mPa·s or less. Note that the organic solvent is the organic solvent that is contained in the binder composition together with the particulate polymer A and the polymer B. This organic solvent is described further below. When the viscosity at a shear rate of $1\ \text{s}^{-1}$ of the mixture of the particulate polymer A and the organic solvent is 1,000 mPa·s or less, an electrode active material can be compounded with a sufficient solid content concentration in a slurry composition that contains the binder composition, and thus an electrochemical device including an electrode mixed material layer formed using the slurry composition can be caused to display even better rate characteristics.

[Amount of Organic Solvent-Insoluble Content in Particulate Polymer A]

When the particulate polymer A is mixed in a concentration of 8 mass % with the organic solvent, the amount of insoluble content is preferably 70 mass % or more, more preferably 80 mass % or more, even more preferably 90 mass % or more, further preferably 94 mass % or more, and may be 100 mass % (i.e., the particulate polymer A may be insoluble in the organic solvent). Note that the organic solvent is the organic solvent that is contained in the binder composition together with the particulate polymer A and the polymer B. This organic solvent is described further below. When the amount of organic solvent-insoluble content in the particulate polymer A is not less than any of the lower limits set forth above, battery characteristics of a secondary battery including an obtained electrode mixed material layer can be improved. Note that the amount of organic solvent-insoluble content can be controlled by adjusting the amount of a cross-linkable monomer in a monomer composition used to produce the particulate polymer A. Moreover, the amount of insoluble content can be measured by a method described in the EXAMPLES section of the present specification.

[Production Method of Particulate Polymer A]

The particulate polymer A having the core-shell structure described above can be produced, for example, by stepwise polymerization in which the proportions of monomers for forming the polymer of the core portion and monomers for forming the polymer of the shell portion are changed over time. Specifically, the particulate polymer A can be produced by continuous, multi-step emulsion polymerization or multi-step suspension polymerization in which a polymer of a preceding step is then covered by a polymer of a succeeding step.

The following describes one example of a case in which the particulate polymer A having the core-shell structure described above is obtained by multi-step emulsion polymerization.

In the polymerization, an anionic surfactant such as sodium polyoxyethylene alkyl ether sulfate, sodium dodecylbenzenesulfonate, or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, ammonium persulfate, or cumene peroxide or an azo compound such as 2,2'-azobis(2-methyl-N-(2-hydroxyethyl)-propionamide) or 2,2'-azobis(2-amidinopropane) hydrochloride, for example, may be used as a polymerization initiator.

The polymerization procedure involves initially mixing monomers for forming the core portion and the emulsifier, and performing emulsion polymerization as one batch to obtain a particulate polymer that forms the core portion. The particulate polymer A having the core-shell structure described above can then be obtained by performing polymerization of monomers for forming the shell portion in the presence of the particulate polymer forming the core portion.

In this polymerization, it is preferable that the monomers for forming the polymer of the shell portion are supplied into the polymerization system continuously or divided into a plurality of portions from a viewpoint of partially covering the outer surface of the core portion with the shell portion. As a result of the monomers for forming the polymer of the shell portion being supplied into the polymerization system in portions or continuously, the polymer forming the shell portion can be formed as particles that bond to the core portion such as to form a shell portion that partially covers the core portion.

[Proportional Content of Particulate Polymer A]

The proportional content of the particulate polymer A in the binder is preferably 5 mass % or more, more preferably 10 mass % or more, and even more preferably 20 mass % or more, and is preferably 40 mass % or less, and more preferably 35 mass % or less. When the proportional content of the particulate polymer A in the binder is not less than any of the lower limits set forth above, peel strength and dusting resistance of an obtained electrode mixed material layer can be further increased. On the other hand, when the proportional content of the particulate polymer A in the binder is not more than any of the upper limits set forth above, sufficiently high coatability of a slurry composition can be ensured.

<<Polymer B>>

The polymer B is a component that can impart a suitable viscosity to a slurry composition containing the binder composition. This can increase coatability of the slurry composition and impart excellent peel strength and dusting resistance to an obtained electrode mixed material layer. Moreover, excellent rate characteristics can be imparted to an electrochemical device including the obtained electrode mixed material layer because an electrode active material and the like can be compounded with a sufficient solid content concentration in the slurry composition without causing sedimentation thereof.

[Viscosity]

The viscosity at a shear rate of $1\ \text{s}^{-1}$ of a mixture obtained by mixing the polymer B in a concentration of 8 mass % with the organic solvent is required to be 100 mPa·s or more, and is preferably 300 mPa·s or more, more preferably 1,000 mPa·s or more, and even more preferably 4,720 mPa·s or more. Moreover, the viscosity at a shear rate of $1\ \text{s}^{-1}$ of the mixture is required to be 10,000 mPa·s or less, and is preferably 9,000 mPa·s or less, more preferably 8,000 mPa·s or less, and even more preferably 5,300 mPa·s or less. Note that the organic solvent is the organic solvent that is contained in the binder composition together with the particulate polymer A and the polymer B. This organic solvent is described further below. When the viscosity at a shear rate of $1\ \text{s}^{-1}$ of the mixture of the polymer B and the organic solvent is 100 mPa·s or more, a slurry composition containing the binder composition has excellent coatability, and, as a result, an obtained electrode mixed material layer can display excellent peel strength and dusting resistance. On the other hand, when the viscosity at a shear rate of $1\ \text{s}^{-1}$ of the mixture of the polymer B and the organic solvent is 10,000 mPa·s or less, an electrode active material can be compounded with a sufficient solid content concentration in a slurry composition that contains the binder composition, and thus an electrochemical device including an electrode mixed material layer formed using the slurry composition can be caused to display excellent rate characteristics.

[Structure]

The polymer B may have a particulate form or a non-particulate form in the organic solvent without any specific limitations so long as it has the specific property set forth above, but normally has a non-particulate form. Note that the organic solvent is the organic solvent that is contained in the binder composition together with the particulate polymer A and the polymer B. This organic solvent is described further below.

[Chemical Composition]

The polymer B can include a cyano group-containing monomer unit, a (meth)acrylic acid ester monomer unit, an acid group-containing monomer unit, an amide group-containing monomer unit, and the like, for example, without any specific limitations.

—Cyano Group-Containing Monomer Unit—

A cyano group-containing monomer unit is a repeating unit that is derived from a cyano group-containing monomer. When the polymer B includes a cyano group-containing monomer unit, the degree of swelling in electrolyte solution of the polymer B can be reduced. Accordingly, reduction of a void part of an electrode mixed material layer due to excessive swelling of the polymer B in electrolyte solution can be inhibited, and internal resistance of an electrochemical device can be reduced to thereby further enhance rate characteristics of the electrochemical device. Moreover, when the polymer B includes a cyano group-containing monomer unit, peel strength and dusting resistance of an obtained electrode mixed material layer can be further increased due to improved polymer strength of the polymer B.

Examples of cyano group-containing monomers that can be used include the cyano group-containing monomers that were previously described in the "Particulate polymer A" section. The use of acrylonitrile as a cyano group-containing monomer is preferable from a viewpoint of even further increasing peel strength and dusting resistance of an electrode mixed material layer and even further enhancing rate characteristics of an electrochemical device.

The proportional content of a cyano group-containing monomer unit in the polymer B when all repeating units included in the polymer B are taken to be 100.0 mass % is preferably 60.0 mass % or more, more preferably 65.0 mass % or more, even more preferably 80.0 mass % or more, and further preferably 90.0 mass % or more, and is preferably 99.0 mass % or less, more preferably 95.0 mass % or less, and even more preferably 93.0 mass % or less. When the proportional content of a cyano group-containing monomer unit in the polymer B is not less than any of the lower limits set forth above, peel strength and dusting resistance of an obtained electrode mixed material layer can be even further increased, and rate characteristics of an electrochemical device including the electrode mixed material layer can be even further enhanced. On the other hand, when the proportional content of a cyano group-containing monomer unit in the polymer B is not more than any of the upper limits set forth above, an obtained electrode mixed material layer can be provided with good pressability, and thus the electrode mixed material layer can be effectively densified by pressing.

—(Meth)Acrylic Acid Ester Monomer Unit—

A (meth)acrylic acid ester monomer unit is a repeating unit that is derived from a (meth)acrylic acid ester monomer. When the polymer B includes a (meth)acrylic acid ester monomer unit, an obtained electrode mixed material layer can be provided with good pressability, and thus the electrode mixed material layer can be effectively densified by pressing.

Examples of (meth)acrylic acid ester monomers that can be used include the (meth)acrylic acid ester monomers that were previously described in the "Particulate polymer A" section. The use of butyl acrylate as a (meth)acrylic acid ester monomer is preferable from a viewpoint of increasing pressability of an electrode mixed material layer.

The proportional content of a (meth)acrylic acid ester monomer unit in the polymer B when all repeating units included in the polymer B are taken to be 100 mass % is preferably 1.5 mass % or more, more preferably 2.0 mass % or more, even more preferably 2.5 mass % or more, and further preferably 4.0 mass % or more, and is preferably 60.0 mass % or less, more preferably 40.0 mass % or less, even more preferably 32.0 mass % or less, and further preferably 10.0 mass % or less. When the proportional content of a (meth)acrylic acid ester monomer unit in the polymer B is within any of the ranges set forth above, an obtained electrode mixed material layer can be provided with better pressability, and thus the electrode mixed material layer can be effectively further densified by pressing.

—Acid Group-Containing Monomer Unit—

An acid group-containing monomer unit is a repeating unit that is derived from an acid group-containing monomer. When the polymer B includes an acid group-containing monomer unit, peel strength and dusting resistance of an obtained electrode mixed material layer can be further increased.

Examples of acid group-containing monomers that can be used include the acid group-containing monomers that were previously described in the "Particulate polymer A" section. The use of acrylic acid as an acid group-containing monomer is preferable from a viewpoint of even further increasing peel strength and dusting resistance of an electrode mixed material layer.

The proportional content of an acid group-containing monomer unit in the polymer B when all repeating units included in the polymer B are taken to be 100 mass % is preferably 0.5 mass % or more, more preferably 1.0 mass % or more, even more preferably 1.5 mass % or more, and further preferably 2.0 mass % or more, and is preferably 40.0 mass % or less, more preferably 20.0 mass % or less, and even more preferably 5.0 mass % or less. When the proportional content of an acid group-containing monomer unit in the polymer B is within any of the ranges set forth above, peel strength and dusting resistance of an obtained electrode mixed material layer can be even further increased.

—Amide Group-Containing Monomer Unit—

An amide group-containing monomer unit is a repeating unit that is derived from an amide group-containing monomer. Examples of amide group-containing monomers that can be used include the amide group-containing monomers that were previously described in the "Particulate polymer A" section. In particular, the use of acrylamide as an amide group-containing monomer is preferable.

The proportional content of an amide group-containing monomer unit in the polymer B can be freely adjusted within a range with which the desired effects are obtained.

[Amount of Organic Solvent-Insoluble Content in Polymer B]

When the polymer B is mixed in a concentration of 8 mass % with the organic solvent, the amount of insoluble content is preferably 50 mass % or less, more preferably 30 mass % or less, and even more preferably 10 mass % or less. The amount insoluble content when the polymer B is mixed with the organic solvent may be 0.1 mass % or more. Note that the organic solvent is the organic solvent that is contained in the binder composition together with the particulate polymer A and the polymer B. This organic solvent is described further below. When the amount of organic solvent-insoluble content in the polymer B is not more than any of the upper limits set forth above, the solid content concentration of a slurry composition produced using the binder composition can be further increased. This is presumed to be due to the polymer B having an effect of inhibiting aggregation of solid content such as an electrode active material in the binder composition. The amount of insoluble content can be measured by a method described in the EXAMPLES section of the present specification.

[Production Method of Polymer B]

No specific limitations are placed on the production method of the polymer B set forth above. For example, the polymer B can be produced by adding a polymerization initiator such as potassium persulfate to a monomer composition containing the monomers set forth above and carrying out a polymerization reaction.

The proportional content of each monomer in the monomer composition used to produce the polymer B can be set in accordance with the proportional content of each repeating unit in the polymer B.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

[Proportional Content of Polymer B]

The proportional content of the polymer B in the binder is preferably 60 mass % or more, and more preferably 65 mass % or more, and is preferably 95 mass % or less, more preferably 90 mass % or less, and even more preferably 80 mass % or less. When the proportional content of the polymer B in the binder is not less than any of the lower limits set forth above, peel strength and dusting resistance of an obtained electrode mixed material layer can be further increased, and rate characteristics of an electrochemical device including the electrode mixed material layer can be further enhanced. On the other hand, when the proportional content of the polymer B in the binder is not more than any of the upper limits set forth above, peel strength and dusting resistance of an obtained electrode mixed material layer can be further increased.

<<Viscosity of Binder (Particulate Polymer a and Polymer B)>>

The viscosity at a shear rate of 1 s$^{-1}$ of a mixture obtained by mixing the binder (particulate polymer A and polymer B) in a concentration of 8 mass % with the organic solvent is preferably 100 mPa·s or more, more preferably 300 mPa·s or more, even more preferably 1,000 mPa·s or more, and further preferably 5,000 mPa·s or more, and is preferably 10,000 mPa·s or less, more preferably 9,000 mPa·s or less, and even more preferably 8,000 mPa·s or less. Note that the organic solvent is the organic solvent that is contained in the binder composition together with the particulate polymer A and the polymer B. This organic solvent is described further below. When the viscosity at a shear rate of 1 s$^{-1}$ of the mixture of the binder and the organic solvent is 100 mPa·s or more, a slurry composition containing the binder composition has excellent coatability, and, as a result, an obtained electrode mixed material layer can display even better peel strength and dusting resistance. On the other hand, when the viscosity at a shear rate of 1 s$^{-1}$ of the mixture of the binder and the organic solvent is 10,000 mPa·s or less, an electrode active material can be compounded with a sufficient solid content concentration in a slurry composition that contains the binder composition, and thus an electrochemical device including an electrode mixed material layer formed using the slurry composition can be caused to display even better rate characteristics.

Moreover, it is particularly preferable that the viscosity at a shear rate of 1 s$^{-1}$ of a mixture obtained by mixing the binder in a concentration of 8 mass % with the organic solvent is 5,000 mPa·s or more. When the viscosity at a shear rate of 1 s$^{-1}$ of the mixture of the binder and the organic solvent is 5,000 mPa·s or more, peel strength and dusting resistance of an obtained electrode mixed material layer can be even further increased, and an electrochemical device including the electrode mixed material layer can be caused to display even better rate characteristics.

<Organic Solvent>

Examples of the organic solvent of the presently disclosed binder composition include alcohols such as methanol, ethanol, n-propanol, isopropanol, n-butanol, isobutanol, t-butanol, pentanol, hexanol, heptanol, octanol, nonanol, decanol, and amyl alcohol, ketones such as acetone, methyl ethyl ketone, and cyclohexanone, esters such as ethyl acetate and butyl acetate, ethers such as diethyl ether, dioxane, and tetrahydrofuran, amide polar organic solvents such as N,N-dimethylformamide and N-methyl-2-pyrrolidone (NMP), and aromatic hydrocarbons such as toluene, xylene, chlorobenzene, ortho-dichlorobenzene, and para-dichlorobenzene. One of these organic solvents may be used individually, or two or more of these organic solvents may be used as a mixture. The use of NMP as the organic solvent is preferable from a viewpoint of further increasing peel strength and dusting resistance of an electrode mixed material layer and further enhancing rate characteristics of an electrochemical device.

<Other Components>

Other than the components set forth above, the presently disclosed binder composition may contain components such as a reinforcing material, a leveling agent, a viscosity modifier, and an additive for electrolyte solution. Commonly known components such as described in WO2012/115096A1, for example, can be used as these components. One of these components may be used individually, or two or more of these components may be used in combination in a freely selected ratio.

<Production of Binder Composition>

The presently disclosed binder composition can be produced by mixing the above-described particulate polymer A, polymer B, organic solvent, and other optional components by a known method. Specifically, the binder composition can be produced by mixing the above-described components using a mixer such as a ball mill, a sand mill, a bead mill, a pigment disperser, a grinding machine, an ultrasonic disperser, a homogenizer, a planetary mixer, or a FILMIX.

Note that in a case in which the particulate polymer A and the polymer B are each polymerized in an organic solvent, a dispersion liquid having the particulate polymer A dispersed in an organic solvent and a dispersion liquid having the polymer B dissolved or dispersed in an organic solvent may be mixed, as obtained, to produce the binder composition.

(Slurry Composition for Electrochemical Device Electrode)

The presently disclosed slurry composition for an electrochemical device electrode contains an electrode active material and the binder composition set forth above, and optionally further contains a conductive material and other components. In other words, the presently disclosed slurry composition normally contains an electrode active material, the previously described particulate polymer A, and the previously described polymer B in the previously described organic solvent, and optionally further contains a conductive material and/or other components. As a result of the presently disclosed slurry composition containing the binder composition set forth above, an electrode mixed material layer formed using the presently disclosed slurry composition has excellent peel strength and dusting resistance and can cause an electrochemical device to display excellent rate characteristics even in a case in which the electrode mixed material layer has increased density and basis weight.

Although the following describes, as one example, a case in which the slurry composition for an electrochemical device electrode is a slurry composition for a lithium ion secondary battery electrode, the presently disclosed slurry composition for an electrochemical device electrode is not limited to the following example.

<Electrode Active Material>

The electrode active material is a material that gives and receives electrons in an electrode of a secondary battery. A material that can occlude and release lithium is normally used as a positive electrode active material for a lithium ion secondary battery.

Specific examples of positive electrode active materials for lithium ion secondary batteries include, without any specific limitations, known positive electrode active materials such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn ($Li(Co Mn Ni)O_2$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, lithium-rich spinel compounds represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$.

The amount and particle diameter of the positive electrode active material are not specifically limited and may be the same as those of conventionally used positive electrode active materials.

Examples of negative electrode active materials for lithium ion secondary batteries include carbon-based negative electrode active materials, metal-based negative electrode active materials, and negative electrode active materials that are combinations thereof.

A carbon-based negative electrode active material can be defined as an active material that contains carbon as its main framework and into which lithium can be inserted (also referred to as "doping"). Examples of carbon-based negative electrode active materials include carbonaceous materials and graphitic materials.

Examples of carbonaceous materials include graphitizing carbon and non-graphitizing carbon, typified by glassy carbon and the like, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials include natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

A metal-based negative electrode active material is an active material that contains metal, the structure of which usually contains an element that allows insertion of lithium, and that has a theoretical electric capacity per unit mass of 500 mAh/g or more when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased through use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

The amount and particle diameter of the negative electrode active material are not specifically limited and may be the same as those of conventionally used negative electrode active materials.

<Conductive Material>

The conductive material ensures electrical contact amongst the electrode active material. Examples of conductive materials include conductive carbon materials such as carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals.

One of these conductive materials may be used individually, or two or more of these conductive materials may be used in combination. The amount and particle diameter of the conductive material are not specifically limited and may be the same as those of conventionally used conductive materials.

<Binder Composition>

A binder composition for an electrochemical device electrode that contains the previously described particulate polymer A, polymer B, and organic solvent is used as the binder composition.

The proportional content of the binder (particulate polymer A and polymer B) among solid components of the slurry composition when the total amount of the particulate polymer A, the polymer B, the electrode active material, and the conductive material (in a case in which the conductive material is included) is taken to be 100 mass % is preferably 0.3 mass % or more, and is preferably 3 mass % or less, and more preferably 2.5 mass % or less. When the proportional content of the binder among solid components of the slurry composition is within any of the ranges set forth above, peel strength and dusting resistance of an obtained electrode mixed material layer can be further increased.

<Other Components>

Examples of other components that may be contained in the slurry composition include, but are not specifically limited to, the same other components as may be contained in the presently disclosed binder composition. One other component may be used individually, or two or more other components may be used in combination in a freely selected ratio.

<Production of Slurry Composition>

The slurry composition set forth above can be produced by dissolving or dispersing the above-described components in the organic solvent. Specifically, the slurry composition can be produced by mixing the above-described components and the organic solvent using a mixer such as a ball mill, a sand mill, a bead mill, a pigment disperser, a grinding machine, an ultrasonic disperser, a homogenizer, a planetary mixer, or a FILMIX. Examples of organic solvents that can be used in production of the slurry composition include the organic solvents that were previously described in the "Binder composition for electrochemical device electrode" section. Moreover, the organic solvent contained in the binder composition may serve as the organic solvent used in production of the slurry composition.

Moreover, production of the binder composition and production of the slurry composition may be performed at the same time by, for example, mixing the particulate polymer A, the polymer B, and the organic solvent, and subsequently adding the electrode active material and other optional components.

(Electrode for Electrochemical Device)

A feature of the presently disclosed electrode for an electrochemical device is that it includes an electrode mixed material layer formed using the presently disclosed slurry composition. More specifically, the presently disclosed electrode includes a current collector and an electrode mixed material layer formed on the current collector, and has the electrode mixed material layer formed using the presently disclosed slurry composition. In other words, the electrode mixed material layer included in the presently disclosed electrode contains at least an electrode active material, the particulate polymer A, and the polymer B, and optionally contains other components. It should be noted that components contained in the electrode mixed material layer are components that are contained in the previously described slurry composition. Furthermore, the preferred ratio of these components in the electrode mixed material layer is the same as the preferred ratio of these components in the slurry composition.

As a result of the electrode mixed material layer included in the presently disclosed electrode being formed using the presently disclosed slurry composition, the electrode mixed material layer has excellent peel strength and dusting resistance and can impart excellent rate characteristics to an electrochemical device even in a case in which the electrode mixed material layer has increased density and basis weight.

<Production Method>

The presently disclosed electrode can be produced, for example, through a step of applying the slurry composition set forth above onto a current collector (application step) and a step of drying the slurry composition that has been applied onto the current collector to form an electrode mixed material layer on the current collector (drying step).

<<Application Step>>

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector.

The thickness of the slurry coating on the current collector after application but before drying can be set as appropriate in accordance with the density and thickness of the electrode mixed material layer that is to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. One of these materials may be used individually, or two or more of these materials may be used in combination in a freely selected ratio.

<<Drying Step>>

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, an electrode mixed material layer can be formed on the current collector to thereby obtain an electrode for an electrochemical device that includes the current collector and the electrode mixed material layer.

After the drying step, the electrode mixed material layer may be further subjected to a pressing process, such as mold pressing or roll pressing. The pressing process can improve the strength of close adherence between components in the electrode mixed material layer and the strength of close adherence between the electrode mixed material layer and the current collector (peel strength of electrode mixed material layer). Furthermore, in a case in which the electrode mixed material layer contains a curable polymer, the polymer is preferably cured after the electrode mixed material layer has been formed.

(Electrochemical Device)

The presently disclosed electrochemical device may be, but is not specifically limited to, a lithium ion secondary battery or an electric double-layer capacitor, for example, and is preferably a lithium ion secondary battery. A feature of the presently disclosed electrochemical device is that it includes the presently disclosed electrode for an electrochemical device set forth above. An electrochemical device such as described above can display excellent rate characteristics.

Although the following describes, as one example, a case in which the electrochemical device is a lithium ion secondary battery, the presently disclosed electrochemical device is not limited to the following example. A lithium ion secondary battery corresponding to the presently disclosed electrochemical device normally includes electrodes (positive electrode and negative electrode), an electrolyte solution, and a separator, and has the presently disclosed electrode for an electrochemical device as at least one of the positive electrode and the negative electrode. In other words, a lithium ion secondary battery in accordance with the present disclosure normally includes the presently disclosed electrode set forth above and optionally includes an electrode other than the presently disclosed electrode. The lithium ion secondary battery in accordance with the present disclosure preferably includes the presently disclosed electrode as the positive electrode.

<Electrode Other than Presently Disclosed Electrode>

Examples of electrodes other than the presently disclosed electrode set forth above that can be used in the lithium ion secondary battery in accordance with the present disclosure include, without any specific limitations, any known electrode that is used in production of a lithium ion secondary battery. Specifically, an electrode obtained by forming an electrode mixed material layer on a current collector by a known production method may be used as an electrode other than the presently disclosed electrode set forth above.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferred for their high dielectric constant and broad stable potential region, and a mixture of ethylene carbonate and diethyl carbonate is more preferable.

The concentration of the electrolyte in the electrolyte solution may be adjusted as appropriate. Moreover, known additives such as vinylene carbonate may be added to the electrolyte solution.

<Separator>

The separator may be a separator such as described in JP2012-204303A, for example, but is not specifically limited thereto. Of these separators, a microporous membrane made of polyolefinic (polyethylene, polypropylene, polybutene, or polyvinyl chloride) resin is preferred since such a membrane can reduce the total thickness of the separator, which increases the proportion of electrode active material in the lithium ion secondary battery, and consequently increases the volumetric capacity of the lithium ion secondary battery.

<Production Method of Lithium Ion Secondary Battery>

The lithium ion secondary battery in accordance with the present disclosure can be produced by, for example, stacking the positive electrode and the negative electrode with the separator in-between, performing rolling, folding, or the like of the resultant laminate, as necessary, in accordance with the battery shape to place the laminate in a battery container, injecting the electrolyte solution into the battery container, and sealing the battery container. In order to prevent pressure increase inside the secondary battery and occurrence of overcharging or overdischarging, an overcurrent preventing device such as a PTC device or a fuse; an expanded metal; or a lead plate may be provided as necessary. The shape of the lithium ion secondary battery may be a coin type, a button type, a sheet type, a cylinder type, a prismatic type, a flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the proportion (charging ratio) constituted by the given monomer among all monomers used in polymerization of the polymer.

In the examples and comparative examples, the following methods were used to calculate, measure, and evaluate the mass proportion of a shell portion in a particulate polymer A, the glass-transition temperatures of polymers of a core portion and a shell portion of a particulate polymer A, the properties of a particulate polymer A, a polymer B, and a binder, the degree of swelling in electrolyte solution of a binder, the amount of NMP-insoluble content in a particulate polymer A and a polymer B, the peel strength and dusting resistance of a positive electrode mixed material layer, and the rate characteristics of a lithium ion secondary battery.

<Mass Proportion of Shell Portion in Particulate Polymer A>

The mass proportion of a shell portion in a particulate polymer A was calculated by the following formula from the total mass M1 of all monomers contained in a monomer composition used to form a core portion and the total mass M2 of all monomers contained in a monomer composition used to form the shell portion.

Mass proportion of shell portion (%)={$M2/(M1+M2)$}×100

<Glass-Transition Temperatures (Tg) of Polymers of Core Portion and Shell Portion of Particulate Polymer A>

A suitable amount of N-methyl-2-pyrrolidone (NMP) as an organic solvent was added to a water dispersion of a particulate polymer A produced in each of the examples and comparative examples to obtain a mixture. Thereafter, vacuum distillation was performed at 90° C. to remove water and excess NMP from the mixture and thereby obtain an NMP dispersion (solid content concentration: 9.0%) of the particulate polymer A.

The obtained NMP dispersion of the particulate polymer A was applied onto a sheet made from polytetrafluoroethylene and was dried in an environment having a temperature of 80° C. to 120° C. for 3 hours to 8 hours to obtain a cast film. The film was cut out as a strip having a thickness of 1.0±0.1 mm, a length of 50±2 mm, and a width of 5±0.1 mm to obtain a test specimen for dynamic viscoelasticity measurement. A viscoelasticity spectrometer (DMS) "EXSTAR DMS5800" (produced by Seiko Instruments Inc.) was used as a dynamic viscoelasticity measurement apparatus to measure the storage modulus, the loss modulus, and tan δ in tension deformation mode under conditions of a frequency of 1 Hz, a measurement temperature of −100° C. to 180° C., and a heating rate of 3° C./min. The temperature of a peak top for tan δ obtained in this manner was taken to be a glass-transition temperature.

The following method was used to determine whether each of two glass-transition temperatures obtained by DMS was a glass-transition temperature of a polymer of a core portion or a glass-transition temperature of a polymer of a shell portion.

First, an ultrathin section of the film obtained as described above was prepared, and the surface of the ultrathin section was measured in tapping mode using an atomic force microscope (AFM) to obtain a phase mapping image. The elastic modulus of the core portion and the elastic modulus of the shell portion were compared to determine whether each of the two glass-transition temperatures obtained by DMS was for the core portion or the shell portion. For example, in a case in which the elastic modulus of the shell portion was lower upon comparison of the elastic modulus of the core portion and the elastic modulus of the shell portion, the lower of the two glass-transition temperatures was taken to be the glass-transition temperature of the polymer of the shell portion and the higher of the two glass-transition temperatures was taken to be the glass-transition temperature of the polymer of the core portion.

<Properties of Particulate Polymer a, Polymer B, and Binder>

A suitable amount of N-methyl-2-pyrrolidone (NMP) as an organic solvent was added to a water dispersion of a particulate polymer A and a water dispersion of a polymer B produced in each of the examples and comparative examples to obtain mixtures. Thereafter, vacuum distillation was performed at 90° C. to remove water and excess NMP from each of the mixtures and thereby obtain mixtures (solid content concentration: 8%) of the particulate polymer A with NMP and the polymer B with NMP as measurement samples. The viscosity of each of the measurement samples was measured at a temperature of 25° C. and a shear rate of 1 s$^{-1}$ using a rotary rheometer (MCR30 produced by Anton Paar GmbH).

In addition, a binder composition for a positive electrode (mixture of a binder and NMP (solid content concentration: 8%)) obtained in each of the examples and comparative examples was used as a measurement sample to measure the viscosity at a shear rate of 1 s$^{-1}$ in the same manner as described above.

<Degree of Swelling in Electrolyte Solution of Binder>

A binder composition for a positive electrode produced in each of the examples and comparative examples was applied onto a sheet made from polytetrafluoroethylene and was dried in an environment having a temperature of 80° C. to 120° C. for 3 hours to 8 hours to obtain a cast film having a thickness of 500 μm±50 μm. The cast film was cut up and approximately 1 g thereof was precisely weighed. The mass of a film piece obtained in this manner was taken to be W0. The film piece was immersed in an electrolyte solution (chemical composition: LiPF$_6$ solution of 1.0 M in concentration (solvent: mixed solvent of ethylene carbonate (EC)/diethyl carbonate (DEC)=3/7 (volume ratio); additive: 2 volume % (solvent ratio) of vinylene carbonate)) for 3 days in an environment having a temperature of 60° C. and was allowed to swell. Thereafter, the film piece was pulled out of the electrolyte solution and the mass thereof was measured after electrolyte solution on the surface of the film piece had been gently wiped off. The mass of the swollen film piece was taken to be W1, and the degree of swelling in electrolyte solution was calculated by the following calculation formula.

Degree of swelling in electrolyte solution (mass %)={(W1−W0)/W0}×100

The degree of swelling in electrolyte solution of the binder in the binder composition for a positive electrode was evaluated by the following standard.

A: Degree of swelling in electrolyte solution of less than 300%
B: Degree of swelling in electrolyte solution of not less than 300% and less than 400%
C: Degree of swelling in electrolyte solution of not less than 400% and less than 500%
D: Degree of swelling in electrolyte solution of 500% or more <Amount of NMP-Insoluble Content in Particulate Polymer A and Polymer B>

For each particulate polymer A and polymer B produced in the examples and comparative examples, 8 g of the polymer was added to 92 g of NMP and was mixed therewith to dissolve the polymer. The resultant mixture was filtered through an 80-mesh wire screen and the mass of a filtration residue remaining on the wire screen was weighed after drying thereof. The mass (g) of the filtration residue was calculated as a proportion relative to 8 g of the added particulate polymer A or polymer B to determine the amount of NMP-insoluble content (%).

<Peel Strength of Positive Electrode Mixed Material Layer>

A positive electrode for a lithium ion secondary battery produced in each of the examples and comparative examples was cut out as a rectangle of 100 mm in length and 10 mm in width to obtain a test specimen. The test specimen was placed with the surface at which the positive electrode mixed material layer was located facing downward, cellophane tape (tape in accordance with JIS Z1522) was affixed to the surface of the positive electrode mixed material layer, and the stress was measured when the current collector was peeled off by pulling one end of the current collector in a perpendicular direction at a pulling speed of 100 mm/min. (Note that the cellophane tape was secured to a test stage.) This measurement was performed three times to obtain an average value. The average value was taken to be the peel strength and was evaluated by the following standard. A larger value for the peel strength indicates better close adherence between the positive electrode mixed material layer and the current collector.

A: Peel strength of 30 N/m or more
B: Peel strength of not less than 25 N/m and less than 30 N/m
C: Peel strength of not less than 20 N/m and less than 25 N/m
D: Peel strength of less than 20 N/m <Dusting Resistance of Positive Electrode Mixed Material Layer>

A positive electrode for a lithium ion secondary battery produced in each of the examples and comparative examples was cut out as rectangles of 600 mm in length and 500 mm in width to prepare five test specimens. Each one of the test specimens was subjected to the following operations and measurements.

First, the initial electrode weight (P0) was measured for the one test specimen. Next, a utility knife was used to make 11 incisions of 1 mm in width in the test specimen, and powder arising during this cutting was gently dusted off. The electrode weight (P1) after cutting was then measured. The amount of dusting of the electrode was calculated by the following calculation formula.

Amount of dusting of electrode (mass %)={(P0−P1)/P0}×100

These operations and measurements were repeated five times so as to determine an average value for the amount of dusting of the electrode for the five test specimens. The dusting resistance of the electrode mixed material layer was evaluated by the following standard. A smaller amount of dusting of the electrode indicates that the electrode mixed material layer has better dusting resistance.

A: Average value for amount of dusting of electrode of less than 0.4%
B: Average value for amount of dusting of electrode of not less than 0.4% and less than 0.6%
C: Average value for amount of dusting of electrode of not less than 0.6% and less than 0.8%
D: Average value for amount of dusting of electrode of 0.8% or more <Rate Characteristics of Lithium Ion Secondary Battery>

A lithium ion secondary battery produced in each of the examples and comparative examples was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was then discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage: 4.20 V) and CC discharging of the lithium ion secondary battery was performed to a cell voltage of 3.00 V with a 0.2 C constant current. This charging and discharging at 0.2 C was repeated three times.

Next, 0.2 C constant-current charging and discharging of the lithium ion secondary battery was performed between cell voltages of 4.20 V and 3.00 V in an environment having a temperature of 25° C., and the discharge capacity at this time was defined as C0. Thereafter, the lithium ion secondary battery was CC-CV charged with a 0.2 C constant current in the same manner, was subsequently discharged to 3.0 V with a 2.0 C constant current in an environment having a temperature of 25° C., and the discharge capacity at this time was defined as C1. The rate of capacity change expressed by ΔC=(C1/C0)×100(%) was calculated as a rate characteristic and was evaluated by the following standard. A larger value for the rate of capacity change ΔC indicates higher discharge capacity and lower internal resistance.

A: Rate of capacity change ΔC of 75% or more
B: Rate of capacity change ΔC of not less than 73% and less than 75%
C: Rate of capacity change ΔC of not less than 70% and less than 73%
D: Rate of capacity change ΔC of less than 70%

Example 1

<Production of Particulate Polymer A>
[Core Portion Formation Step]

A 1 L septum-equipped flask that included a stirrer was charged with 100 parts of deionized water, the gas phase was purged with nitrogen gas, and heating was performed to 80° C. Thereafter, 0.3 parts of ammonium persulfate (APS) as a polymerization initiator was dissolved in 5.7 parts of deionized water and was added into the flask.

Meanwhile, a monomer composition was obtained in a separate vessel by mixing 40 parts of deionized water, 0.18 parts of sodium polyoxyethylene alkyl ether sulfate (LATEMUL E-118B produced by Kao Corporation) as an emulsifier, 40.50 parts (40.5% in core portion) of n-butyl acrylate and 55.10 parts (55.1% in core portion) of methyl methacrylate as (meth)acrylic acid ester monomers, 4.00 parts (4.0% in core portion) of methacrylic acid as an acid group-containing monomer, and 0.40 parts (0.4% in core portion) of allyl methacrylate as a cross-linkable monomer. The monomer composition was continuously added to the 1 L septum-equipped flask over 1 hour to carry out polymerization. The reaction was carried out at 80° C. during this addition. After completion of this addition, further stirring was performed at 80° C. for 1 hour to complete the reaction.

[Shell Portion Formation Step]

Next, a monomer composition containing 15.6 parts (78% in shell portion) of n-butyl acrylate and 3.4 parts (17% in shell portion) of methyl methacrylate as (meth)acrylic acid ester monomers, 0.52 parts (2.6% in shell portion) of acrylic acid as an acid group-containing monomer, 0.40 parts (2% in shell portion) of hydroxyethyl acrylate as a hydroxy group-containing monomer, and 0.08 parts (0.4% in shell portion) of allyl methacrylate as a cross-linkable monomer was added to the polymerization system in an addition time of 2 minutes or less. After completion of this addition, heating was performed to 80° C. and a reaction was allowed to proceed for 3 hours. A water dispersion containing a particulate polymer A that was obtained in this manner was then cooled to 30° C. or lower.

A suitable amount of N-methyl-2-pyrrolidone (NMP) as an organic solvent was added to a portion of the water dispersion containing the particulate polymer A to obtain a mixture, and then vacuum distillation was performed at 90° C. to remove water from the mixture and thereby obtain an NMP dispersion of the particulate polymer A. The obtained NMP dispersion of the particulate polymer A was applied onto a sheet made from polytetrafluoroethylene and was dried in an environment having a temperature of 80° C. to 120° C. for 3 hours to 8 hours to obtain a cast film. An ultrathin section of the obtained cast film was prepared, and the surface of the ultrathin section was measured in tapping mode using an atomic force microscope (AFM) to obtain a phase mapping image. Through observation of a difference in elastic modulus within the obtained phase mapping image, it was confirmed that the particulate polymer A was a particulate polymer having a core-shell structure including a core portion and a shell portion at least partially covering an outer surface of the core portion. Calculation results of the mass proportion of the shell portion in the particulate polymer A and measurement results of the glass-transition temperatures of polymers of the core portion and the shell portion of the particulate polymer A are shown in Table 1.

<Production of Polymer B>

A reactor A to which a mechanical stirrer and a condenser were attached was charged with 85 parts of deionized water and 0.2 parts of sodium dodecylbenzenesulfonate in a nitrogen atmosphere, the reactor A was subsequently heated to 55° C. under stirring, and 0.3 parts of potassium persulfate was added into the reactor A as a 5.0% aqueous solution. Next, a monomer mixture was produced in a separate vessel B to which a mechanical stirrer was attached by adding 93.0 parts of acrylonitrile as a cyano group-containing monomer, 1.0 parts of acrylamide as an amide group-containing monomer, 2.0 parts of acrylic acid as an acid group-containing monomer, 4.0 parts of n-butyl acrylate as a (meth)acrylic acid ester monomer, 0.6 parts of sodium dodecylbenzenesulfonate, 0.035 parts of t-dodecyl mercaptan, 0.4 parts of polyoxyethylene lauryl ether, and 80 parts of deionized water into the vessel B in a nitrogen atmosphere and performing stirring and emulsification thereof. The monomer mixture was added into the reactor A at a constant rate over 5 hours while in a stirred and emulsified state, and a reaction was carried out until the polymerization conversion rate reached 95% to yield a water dispersion of a polyacrylonitrile copolymer (PAN1) including mainly acrylonitrile units (93%) as a polymer B. The obtained water dispersion of the polymer B was used for measuring properties of the polymer B. The results are shown in Table 1.

<Production of Binder Composition for Positive Electrode>

The obtained water dispersion of the particulate polymer A and the obtained water dispersion of the polymer B were mixed such that the content of the polymer B as a proportion relative to the total content of the particulate polymer A and the polymer B was 80% in order to obtain a water dispersion containing a binder that included the particulate polymer A and the polymer B. A suitable amount of N-methyl-2-pyrrolidone (NMP) as an organic solvent was added to the water dispersion to obtain a mixture. Thereafter, vacuum distillation was performed at 90° C. to remove water and excess NMP from the mixture and thereby obtain a binder composition for a positive electrode (solid content concentration: 8%). The obtained binder composition for a positive electrode was used to measure the degree of swelling in electrolyte solution of the binder contained in the binder composition for a positive electrode. The result is shown in Table 1.

<Production of Slurry Composition for Positive Electrode>

A planetary mixer was charged with 97 parts of NMC532 (lithium-containing complex oxide of Co—Ni—Mn) as a positive electrode active material, 1.5 parts of acetylene black (produced by Denka Company Limited; product name: HS-100) as a conductive material, and 1.5 parts (in terms of solid content of binder) of the binder composition for a positive electrode obtained as described above (i.e., 1.5% among solid components of the slurry composition), these materials were mixed, and then NMP was gradually added as an organic solvent and was mixed therewith by stirring at a temperature of 25±3° C. and rotation speed of 25 rpm so as to adjust the viscosity to 3,600 mPa·s as measured by a B-type viscometer at 60 rpm (M4 rotor) and 25±3° C.

<Production of Positive Electrode>

The slurry composition for a positive electrode obtained as described above was applied onto aluminum foil of 20 μm in thickness serving as a current collector by a comma coater such as to have a coating weight of 21±0.5 mg/cm².

The slurry composition on the aluminum foil was dried by conveying the aluminum foil inside a 100° C. oven for 2 minutes and a 130° C. oven for 2 minutes at a speed of 200 mm/min to obtain a positive electrode web including a positive electrode mixed material layer formed on the current collector.

Thereafter, the positive electrode mixed material layer side of the produced positive electrode web was roll pressed with a line pressure of 14 t (tons) in an environment having a temperature of 25±3° C. to obtain a positive electrode having a positive electrode mixed material layer density of 3.50 g/cm³. The peel strength and dusting resistance of the positive electrode mixed material layer were evaluated with respect to the obtained positive electrode. The results are shown in Table 1.

<Production of Binder Composition for Negative Electrode>

A 5 MPa pressure vessel equipped with a stirrer was charged with 62 parts of styrene, 35 parts of 1,3-butadiene, 2 parts of itaconic acid, 1 part of 2-hydroxyethyl acrylate, 0.3 parts of t-dodecyl mercaptan as a molecular weight modifier, 5 parts of sodium dodecylbenzenesulfonate as an emulsifier, 150 parts of deionized water, and 1 part of potassium persulfate as a polymerization initiator. These materials were sufficiently stirred and were then heated to a temperature of 55° C. to initiate polymerization. The reaction was quenched by cooling at the point at which monomer consumption reached 95.0%. A water dispersion containing a polymer that was obtained in this manner was adjusted to pH 8 through addition of 5% sodium hydroxide aqueous solution. Unreacted monomer was subsequently removed through thermal-vacuum distillation. Thereafter, cooling was performed to a temperature of 30° C. or lower to yield a water dispersion containing a binder for a negative electrode.

<Production of Slurry Composition for Negative Electrode>

A planetary mixer was charged with 48.75 parts of artificial graphite (theoretical capacity: 360 mAh/g) and 48.75 parts of natural graphite (theoretical capacity: 360 mAh/g) as negative electrode active materials, and 1 part in terms of solid content of carboxymethyl cellulose as a thickener. These materials were diluted to a solid content concentration of 60% with deionized water and were subsequently kneaded at a rotation speed of 45 rpm for 60 minutes. Thereafter, 1.5 parts in terms of solid content of the binder composition for a negative electrode obtained as described above was added and was kneaded therewith at a rotation speed of 40 rpm for 40 minutes. Deionized water was then added to adjust the viscosity to 3,000±500 mPa·s (measured by a B-type viscometer at 25° C. and 60 rpm) and thereby produce a slurry composition for a negative electrode.

<Production of Negative Electrode>

The slurry composition for a negative electrode was applied onto the surface of copper foil of 15 μm in thickness serving as a current collector by a comma coater such as to have a coating weight of 12.5±0.5 mg/cm². The copper foil with the slurry composition for a negative electrode applied thereon was subsequently conveyed inside an 80° C. oven for 2 minutes and a 110° C. oven for 2 minutes at a speed 400 mm/min to dry the slurry composition on the copper foil and obtain a negative electrode web including a negative electrode mixed material layer formed on the current collector.

Thereafter, the negative electrode mixed material layer side of the produced negative electrode web was roll pressed with a line pressure of 11 t (tons) in an environment having a temperature of 25±3° C. to obtain a negative electrode having a negative electrode mixed material layer density of 1.60 g/cm³.

<Preparation of Separator for Lithium Ion Secondary Battery>

A separator made from a single layer of polypropylene (#2500 produced by Celgard, LLC.) was used.

<Production of Lithium Ion Secondary Battery>

A single-layer laminate cell (initial design discharge capacity: equivalent to 30 mAh) was produced using the negative electrode, positive electrode, and separator described above and was arranged inside aluminum packing.

The aluminum packing was subsequently filled with a LiPF$_6$ solution of 1.0 M in concentration (solvent: mixed solvent of ethylene carbonate (EC)/diethyl carbonate (DEC)=3/7 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery.

The lithium ion secondary battery was used to evaluate rate characteristics. The result is shown in Table 1.

Examples 2 and 3

Various operations, calculations, measurements, and evaluations were performed in the same way as in Example 1 with the exception that the chemical composition of the monomer composition used in the shell portion formation step for the particulate polymer A was changed as shown in Table 1. The results are shown in Table 1.

Examples 4 and 5

Various operations, calculations, measurements, and evaluations were performed in the same way as in Example 1 with the exception that the proportional content of each of the particulate polymer A and the polymer B was changed as shown in Table 1 in production of the binder composition for a positive electrode. The results are shown in Table 1.

Example 6

Various operations, calculations, measurements, and evaluations were performed in the same way as in Example 1 with the exception that monomers used in production of the polymer B were changed to 65.0 parts of acrylonitrile as a cyano group-containing monomer, 1.0 parts of acrylamide as an amide group-containing monomer, 2.0 parts of acrylic acid as an acid group-containing monomer, and 32.0 parts of n-butyl acrylate as a (meth)acrylic acid ester monomer so as to obtain a water dispersion of a polyacrylonitrile copolymer (PAN2) including mainly acrylonitrile units (65%) as the polymer B. The results are shown in Table 1.

Example 7

Various operations, calculations, measurements, and evaluations were performed in the same way as in Example 1 with the exception that monomers used in production of the polymer B were changed to 2.0 parts of acrylic acid as an acid group-containing monomer, and 38.0 parts of methyl methacrylate and 60.0 parts of n-butyl acrylate as (meth)acrylic acid ester monomers so as to obtain a water dispersion of an acrylic copolymer as the polymer B. The results are shown in Table 1.

Comparative Examples 1 and 2

Various operations, calculations, measurements, and evaluations were performed in the same way as in Example 1 with the exception that the chemical composition of the monomer composition used in the shell portion formation step for the particulate polymer A was changed as shown in Table 1. The results are shown in Table 1.

Comparative Example 3

Various operations, calculations, measurements, and evaluations were performed in the same way as in Example 1 with the exception that after obtaining a water dispersion containing a binder including the particulate polymer A and the polymer B in production of the binder composition for a positive electrode, the water dispersion was used as the binder composition for a positive electrode without adding NMP as an organic solvent, and water was used instead of NMP used as an organic solvent in production of the slurry composition for a positive electrode. The results are shown in Table 1.

Comparative Example 4

Various operations, calculations, measurements, and evaluations were performed in the same way as in Example 1 with the exception that the polymer B was not used in production of the binder composition for a positive electrode. The results are shown in Table 1.

In Table 1, shown below:
"MMA" indicates methyl methacrylate;
"AA" indicates acrylic acid;
"HEA" indicates hydroxyethyl acrylate;
"AMA" indicates allyl methacrylate;
"BA" indicates n-butyl acrylate;
"MAA" indicates methacrylic acid;
"AN" indicates acrylonitrile; and
"Aam" indicates acrylamide.

TABLE 1

| | | | | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|---|---|---|
| Binder | Particulate polymer A | Shell portion | Glass-transition temperature (°C.) | -35 | -50 | 4 | -35 | -35 | -35 | -35 | 40 | -52 | -35 | -35 |
| | | Physical properties Chemical composition (mass %) | (Meth)acrylic acid ester BA | 78 | 92 | 48 | 78 | 78 | 78 | 78 | 27 | 95 | 78 | 78 |
| | | | monomer MMA | 17 | 3 | 47 | 17 | 17 | 17 | 17 | 68 | — | 17 | 17 |
| | | | Acid group-containing monomer AA | 2.6 | 2.6 | 2.6 | 2.6 | 2.6 | 2.6 | 2.6 | 2.6 | 2.6 | 2.6 | 2.6 |
| | | | Hydroxy group-containing monomer HEA | 2 | 2 | 2 | 2 | 2 | 2 | 2 | 2 | 2 | 2 | 2 |
| | | | Cross-linkable monomer AMA | 0.4 | 0.4 | 0.4 | 0.4 | 0.4 | 0.4 | 0.4 | 0.4 | 0.4 | 0.4 | 0.4 |
| | | Mass proportion of shell portion in particulate polymer A (mass %) | | 20 | 20 | 20 | 20 | 20 | 20 | 20 | 20 | 20 | 20 | 20 |
| | | Core portion | Chemical composition (mass %) Cross-linkable monomer AMA | 0.4 | 0.4 | 0.4 | 0.4 | 0.4 | 0.4 | 0.4 | 0.4 | 0.4 | 0.4 | 0.4 |
| | | | (Meth)acrylic acid ester BA | 40.5 | 40.5 | 40.5 | 40.5 | 40.5 | 40.5 | 40.5 | 40.5 | 40.5 | 40.5 | 40.5 |
| | | | MMA | 55.1 | 55.1 | 55.1 | 55.1 | 55.1 | 55.1 | 55.1 | 55.1 | 55.1 | 55.1 | 55.1 |
| | | | Acid group-containing monomer MAA | 4.0 | 4.0 | 4.0 | 4.0 | 4.0 | 4.0 | 4.0 | 4.0 | 4.0 | 4.0 | 4.0 |
| | | Physical properties | Glass-transition temperature (°C.) | 26 | 26 | 26 | 26 | 26 | 26 | 26 | 26 | 26 | 26 | 26 |
| | | Mass proportion of core portion in particulate polymer A (mass %) | | 80 | 80 | 80 | 80 | 80 | 80 | 80 | 80 | 80 | 80 | 80 |
| | | Physical properties | Viscosity (shear rate 1 s$^{-1}$) | 32 | 40 | 32 | 32 | 32 | 32 | 32 | 25 | 38 | 32 | 32 |
| | | | Amount of NMP-insoluble content (mass %) | 94 | 93 | 94 | 94 | 94 | 94 | 94 | 94 | 92 | 94 | 94 |
| | | Proportional content (mass %) | | 20 | 20 | 20 | 40 | 5 | 20 | 20 | 20 | 20 | 20 | 100 |
| | Polymer B | Type | | PAN1 | PAN1 | PAN1 | PAN1 | PAN1 | PAN2 | Acrylic | PAN1 | PAN1 | PAN1 | — |
| | | Physical properties | Viscosity (shear rate 1 s$^{-1}$) | 5300 | 5300 | 5300 | 5300 | 5300 | 5150 | 4720 | 5300 | 5300 | 5300 | — |
| | | | Amount of NMP-insoluble content (mass %) | 0.2 | 0.2 | 0.2 | 0.2 | 0.2 | 0.2 | 0.1 | 0.2 | 0.2 | 0.2 | — |
| | | Proportional content (mass %) | | 80 | 80 | 80 | 60 | 95 | 80 | 80 | 80 | 80 | 80 | — |
| Physical properties of binder | | Viscosity Viscosity (shear rate 1 s$^{-1}$) | | 5170 | 5170 | 5170 | 5170 | 5170 | 4980 | 4650 | 5170 | 5170 | 5170 | 32 |
| Solvent | | Type | | NMP | NMP | NMP | NMP | NMP | NMP | NMP | NMP | NMP | Water | NMP |
| Evaluation | | Peel strength of positive electrode mixed material layer | | A | A | B | B | B | B | B | D | B | D | D |
| | | Dusting resistance of positive electrode mixed material layer | | A | A | B | B | B | E | B | D | B | D | D |
| | | Degree of swelling in electrolyte solution of binder | | A | B | A | B | A | C | C | A | D | C | D |
| | | Rate characteristics of lithium ion secondary battery | | A | B | A | B | A | C | C | A | D | D | D |

It can be seen from Table 1 that it was possible to produce an electrode mixed material layer having excellent peel strength and dusting resistance and a lithium ion secondary battery capable of displaying excellent rate characteristics in Examples 1 to 7 in which the used binder composition contained an organic solvent and a binder including a particulate polymer A that had a core-shell structure including a shell portion having a glass-transition temperature within a specific range and a polymer B that had a specific property.

It can also be seen that although a lithium ion secondary battery could display excellent rate characteristics in Comparative Example 1 in which a particulate polymer that had a core-shell structure including a shell portion having a glass-transition temperature exceeding the specific range was used, peel strength and dusting resistance of an electrode mixed material layer in Comparative Example 1 were poor. On the other hand, it can be seen that although an electrode mixed material layer having excellent peel strength and dusting resistance was obtained in Comparative Example 2 in which a particulate polymer that had a core-shell structure including a shell portion having a glass-transition temperature that did not satisfy the specific range was used, rate characteristics of a lithium ion secondary battery in Comparative Example 2 were poor.

It can also be seen that peel strength and dusting resistance of an electrode mixed material layer and rate characteristics of a lithium ion secondary battery were poor in Comparative Example 3 in which water was used as a solvent instead of using an organic solvent.

Furthermore, it can be seen that peel strength and dusting resistance of an electrode mixed material layer and rate characteristics of a lithium ion secondary battery were poor in Comparative Example 4 in which the used binder only included a particulate polymer A having the previously described core-shell structure and did not include a polymer B having the specific property.

INDUSTRIAL APPLICABILITY

According to the present disclosure, it is possible to provide a binder composition for an electrochemical device electrode and a slurry composition for an electrochemical device electrode with which it is possible to form an electrode mixed material layer that has excellent peel strength and dusting resistance and that can cause an electrochemical device to display excellent rate characteristics.

Moreover, according to the present disclosure, it is possible to provide an electrode for an electrochemical device including an electrode mixed material layer that has excellent peel strength and dusting resistance and that can cause an electrochemical device to display excellent rate characteristics.

Furthermore, according to the present disclosure, it is possible to provide an electrochemical device that includes the aforementioned electrode and that can display excellent rate characteristics.

The invention claimed is:

1. A binder composition for an electrochemical device electrode comprising a binder and an organic solvent, wherein
   the binder includes a particulate polymer A and a polymer B,
   the particulate polymer A has a core-shell structure including a core portion and a shell portion at least partially covering an outer surface of the core portion,
   a polymer forming the shell portion has a glass-transition temperature of not lower than −50° C. and not higher than 20° C.,
   a mixture obtained by mixing the polymer B in a concentration of 8 mass % with the organic solvent has a viscosity at a shear rate of $1\ s^{-1}$ of not less than 100 mPa·s and not more than 10,000 mPa·s, and
   the polymer B includes a (meth) acrylic acid ester monomer unit.

2. The binder composition for an electrochemical device electrode according to claim 1, wherein proportional content of the polymer B in the binder is not less than 60 mass % and not more than 95 mass %.

3. The binder composition for an electrochemical device electrode according to claim 1, wherein the polymer B includes a cyano group-containing monomer unit in a proportion of 60 mass % or more.

4. The binder composition for an electrochemical device electrode according to claim 1, wherein a polymer forming the core portion includes a cross-linkable monomer unit in a proportion of not less than 0.01 mass % and not more than 4.00 mass %.

5. The binder composition for an electrochemical device electrode according to claim 1, wherein a mixture obtained by mixing the binder in a concentration of 8 mass % with the organic solvent has a viscosity at a shear rate of $1\ s^{-1}$ of 5,000 mPa·s or more.

6. A slurry composition for an electrochemical device electrode comprising: an electrode active material; and the binder composition for an electrochemical device electrode according to claim 1.

7. An electrode for an electrochemical device comprising an electrode mixed material layer formed using the slurry composition for an electrochemical device electrode according to claim 6.

8. An electrochemical device comprising the electrode for an electrochemical device according to claim 7.

* * * * *